United States Patent
Das et al.

(10) Patent No.: US 10,511,505 B2
(45) Date of Patent: Dec. 17, 2019

(54) SYSTEMS AND METHODS TO RECREATE REAL WORLD APPLICATION LEVEL TEST PACKETS FOR NETWORK TESTING

(71) Applicant: Keysight Technologies Singapore (Sales) Pte. Ltd., Singapore (SG)

(72) Inventors: Soumava Das, Kolkata (IN); Eric Reeves, Austin, TX (US); Rohan Chitradurga, Fremont, CA (US); Rudrarup Naskar, Kolkatta (IN)

(73) Assignee: Keysight Technologies Singapore (Sales) PTE. LTD., Singapore (SG)

( * ) Notice: Subject to any disclaimer, the term of this patent is extended or adjusted under 35 U.S.C. 154(b) by 208 days.

(21) Appl. No.: 14/964,019

(22) Filed: Dec. 9, 2015

(65) Prior Publication Data
US 2017/0171044 A1 Jun. 15, 2017

(51) Int. Cl.
*H04L 12/26* (2006.01)
*H04L 29/08* (2006.01)

(52) U.S. Cl.
CPC .............. *H04L 43/08* (2013.01); *H04L 43/50* (2013.01); *H04L 69/324* (2013.01); *H04L 69/329* (2013.01)

(58) Field of Classification Search
USPC ........................................................ 709/224
See application file for complete search history.

(56) References Cited

U.S. PATENT DOCUMENTS

| 7,548,657 | B2* | 6/2009 | Deaven | H04N 19/46 382/239 |
| 2007/0016432 | A1* | 1/2007 | Piggott | G06Q 10/06 705/7.37 |
| 2009/0271412 | A1* | 10/2009 | Lacapra | G06F 17/30206 |
| 2009/0319248 | A1 | 12/2009 | White et al. | |
| 2011/0302513 | A1* | 12/2011 | Ademar | G06F 9/4443 715/762 |
| 2013/0346987 | A1* | 12/2013 | Raney | G06F 9/5044 718/102 |

(Continued)

OTHER PUBLICATIONS

Ixia, "A Paradigm Shift for Network Visibility: Delivering Better Data for Better Decisions", Rev. A. 14 pgs. (May 2014).

(Continued)

*Primary Examiner* — Umar Cheema
*Assistant Examiner* — John Fan (57) ABSTRACT

Systems and methods are disclosed to recreate real world application level test packets for network testing. Live network traffic is monitored within a live network infrastructure, and live traffic meta-data is then collected for this live traffic. Application level meta-data is then extracted from the live traffic meta-data and stored in one or more data storage systems. Subsequently, the application level meta-data is received from the one or more data storage systems, and application level test packets for network testing are then generated based upon the application level meta-data. Further, application level meta-data collected during a time slot can be segmented in multiple different data segments associated with different time periods within the time slot, and application level test packets can be generated using these different data segments. Further, the live traffic meta-data collection can occur within multiple time slots.

18 Claims, 6 Drawing Sheets

(56) References Cited

U.S. PATENT DOCUMENTS

2013/0347103 A1* 12/2013 Veteikis ................. H04L 43/04
                                                    726/22
2014/0153406 A1*  6/2014 Brolin .................... H04L 43/50
                                                    370/241.1
2014/0258781 A1   9/2014 Cook
2015/0101043 A1   4/2015 Clifton et al.

OTHER PUBLICATIONS

Ixia, "Ixia Application and Threat Intelligence Processor", Data Sheet, 3 pgs. (May 2014).

* cited by examiner

SYSTEMS AND METHODS TO RECREATE REAL WORLD APPLICATION LEVEL TEST PACKETS FOR NETWORK TESTING

TECHNICAL FIELD OF THE INVENTION

This invention relates to generation of application level test packets for testing of packet network communication systems.

BACKGROUND

Testing network infrastructures and network end nodes often requires network test equipment that is capable of generating large numbers of test packets to simulate network traffic. This test traffic can also include application level test packets that emulate network packets associated with application level protocols. In addition, it is often desirable to test network infrastructures using network traffic experienced within real world network systems rather than using simulated network traffic. For example, a service provider may find that a particular mix of applications is causing a degradation of service in their network infrastructure and would like to replicate this traffic in a test network infrastructure. Replicating real world traffic in a test laboratory, however, is often difficult to achieve particularly for network service providers and enterprises that employ wide ranging network systems.

One possible solution is to capture packets within live network traffic using capture tools and then to replay this captured traffic within a test environment. However, such a direct packet capture technique would lead to inaccurate representations of the application level activity within the network, would capture a wide variety of extraneous and irrelevant packets, and would not be readily scalable due to the extremely large numbers of packets and associated data that would be required to be captured within live network traffic for network infrastructures. In addition, the packet capture itself may provide little visibility into application level interactions within the network infrastructure.

SUMMARY OF THE INVENTION

Systems and methods are disclosed to recreate real world application level test packets for network testing. In disclosed embodiments, live network traffic is monitored within a live network infrastructure, and live traffic meta-data is collected for network packets within the live traffic. Application level meta-data is then extracted from the live traffic meta-data and stored in one or more data storage systems. Subsequently, the application level meta-data is received from the one or more data storage systems. Application level test packets are then generated based upon the application level meta-data, and these application level test packets are forwarded to test network infrastructure. Further, application level meta-data collected during a time slot can be segmented in multiple different data segments associated with different time periods within the time slot, and application level test packets can be generated using these different data segments. Further, the live traffic meta-data collection can occur within multiple time slots. Different features and variations can be implemented, as desired, and related systems and methods can be utilized, as well.

For one embodiment, a method to generate test packets is disclosed including monitoring live network traffic within a live network infrastructure, collecting live traffic meta-data associated with network packets within the live traffic, extracting application level meta-data from the live traffic meta-data, storing the application level meta-data in one or more data storage systems, subsequently receiving the application level meta-data from the one or more data storage systems, generating application level test packets based upon the application level meta-data, and forwarding the application level test packets to a test network infrastructure.

In additional embodiments, the collecting occurs over a time slot, and the method further includes segmenting the application level meta-data for the time slot into multiple data segments associated with different time periods within the time slot. In further embodiments, the generating includes generating application level test packets for each time period based upon the application level meta-data for that time period. In other embodiments, the application level meta-data includes application data and usage data associated with the application data. In still further embodiments, the generating includes generating application level test packets for each time period based upon the application data and the usage data within the application level meta-data for that time period.

In additional embodiments, the collecting occurs over multiple time slots, and the generating further includes generating application level test packets for each time slot based upon application level meta-data extracted from live traffic meta-data collected during that time slot.

In additional embodiments, the monitoring includes processing the live network traffic to identify a network related threat within the live network traffic. In further embodiments, the method further includes comparing the live network traffic to application signatures to identify applications operating within the live network infrastructure.

In additional embodiments, the method includes parsing the application level meta-data to identify traffic parameters, and using the traffic parameters to generate the application level test packets. In further embodiments, the traffic parameters include application data, and the method further includes using application profiles to generate the application level test packets based upon the application data.

For one embodiment, a system to generate test packets is disclosed including a packet processor and a test packet generator. The packet processor is configured to monitor live network traffic within a live network infrastructure, to collect live traffic meta-data associated with network packets within the live traffic, to extract application level meta-data from the live traffic meta-data, and to store the application level meta-data in one or more data storage systems. The test packet generator is configured to receive the stored application level meta-data from the one or more data storage systems, to generate application level test packets based upon the application level meta-data, and to forward the application level test packets to a test network infrastructure.

In addition embodiments, the packet processor is further configured to collect the live traffic meta-data a time slot, and the test packet generator is further configured to segment the application level meta-data for the time slot into multiple data segments associated with different time periods within the time slot. In further embodiments, the test packet generator is further configured to generate application level test packets for each time period based upon the application level meta-data for that time period. In other embodiments, the application level meta-data includes application data and usage data associated with the application data. In still further embodiments, the test packet generator is further configured to generate application level test packets for each time period based upon the application data and the usage data within the application level meta-data for that time period.

In additional embodiments, the packet processor is further configured to collect live traffic meta-data over multiple time slots, and the test packet generator is further configured to generate application level test packets for each time slot based upon application level meta-data extracted from live traffic meta-data collected during that time slot.

In additional embodiments, the packet processor is further configured to process the live network traffic to identify a network related threat within the live network traffic. In further embodiments, the packet processor is further configured to compare the live network traffic to application signatures to identify applications operating within the live network infrastructure.

In additional embodiments, the test packet generator is further configured to parse the application level meta-data to identify traffic parameters and to use the traffic parameters to generate the application level test packets. In further embodiments, the traffic parameters include application data, and the test packet generator is further configured to use application profiles to generate the application level test packets based upon the application data.

Different features and variations can be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed to recreate real world application level test packets for network testing. In disclosed embodiments, live network traffic is monitored within a live network infrastructure, and live traffic meta-data is collected for network packets within the live traffic. Application level meta-data is then extracted from the live traffic meta-data and stored in one or more data storage systems. Subsequently, the application level meta-data is received from the one or more data storage systems. Application level test packets are then generated based upon the application level meta-data, and these application level test packets are forwarded to test network infrastructure. Further, application level meta-data collected during a time slot can be segmented in multiple different data segments associated with different time periods within the time slot, and application level test packets can be generated using these different data segments. Further, the live traffic meta-data collection can occur within multiple time slots. Different features and variations can be implemented, as desired, and related systems and methods can be utilized, as well.

In certain embodiments, meta-data from live real-world traffic is collected and stored using a network visibility tool, such as an application threat processor, and/or other network analysis tools. Information (e.g., traffic signatures, duration, endpoints, etc.) contained within this live traffic meta-data is then used to regenerate live traffic for test network infrastructures, for example, using traffic generation tools or devices. In part, these application threat processors or other network analysis tools are configured to inspect, analyze, collect, and export meta-data about the live traffic being monitored within the live network infrastructure. This live traffic meta-data is then processed to extract information about the live traffic such as applications, network end points, etc. The extracted information can then be further processed to map it to traffic signatures, duration, and endpoints that can then be configured on traffic generation tools for generation of application level test packets. The recreated test traffic, therefore, will have similar characteristics to the original live traffic.

Storing and using packet meta-data collected from the live traffic within the live network infrastructure instead of actual captured packets reduces data storage requirements and allows the disclosed embodiments to be scalable. The live traffic meta-data does not contain the payload data of the network packets for the original live traffic, and the live traffic meta-data is a fraction in size as compared to equivalent packet capture data. This reduced size avoids the extremely large data storage requirements for direct packet capture, and the application level meta-data information can be used by the test generation tool to recreate application level activity in the test network infrastructure. Further, the meta-data collection allows for improved accuracy within the regenerated traffic in part by allowing easier pre-processing prior to recreation of live traffic such as removing duplicate packet information, extraneous packet information, and/or other pre-processing. It is noted that live traffic and live network infrastructure is used herein to refer to traffic and network infrastructure that has been installed and is in actual use by end customers. In contrast, it is noted that test traffic and test network infrastructure is used herein to refer to traffic and network infrastructure that is being used for testing purposes and is not currently in actual use by end customers.

Figure 1:
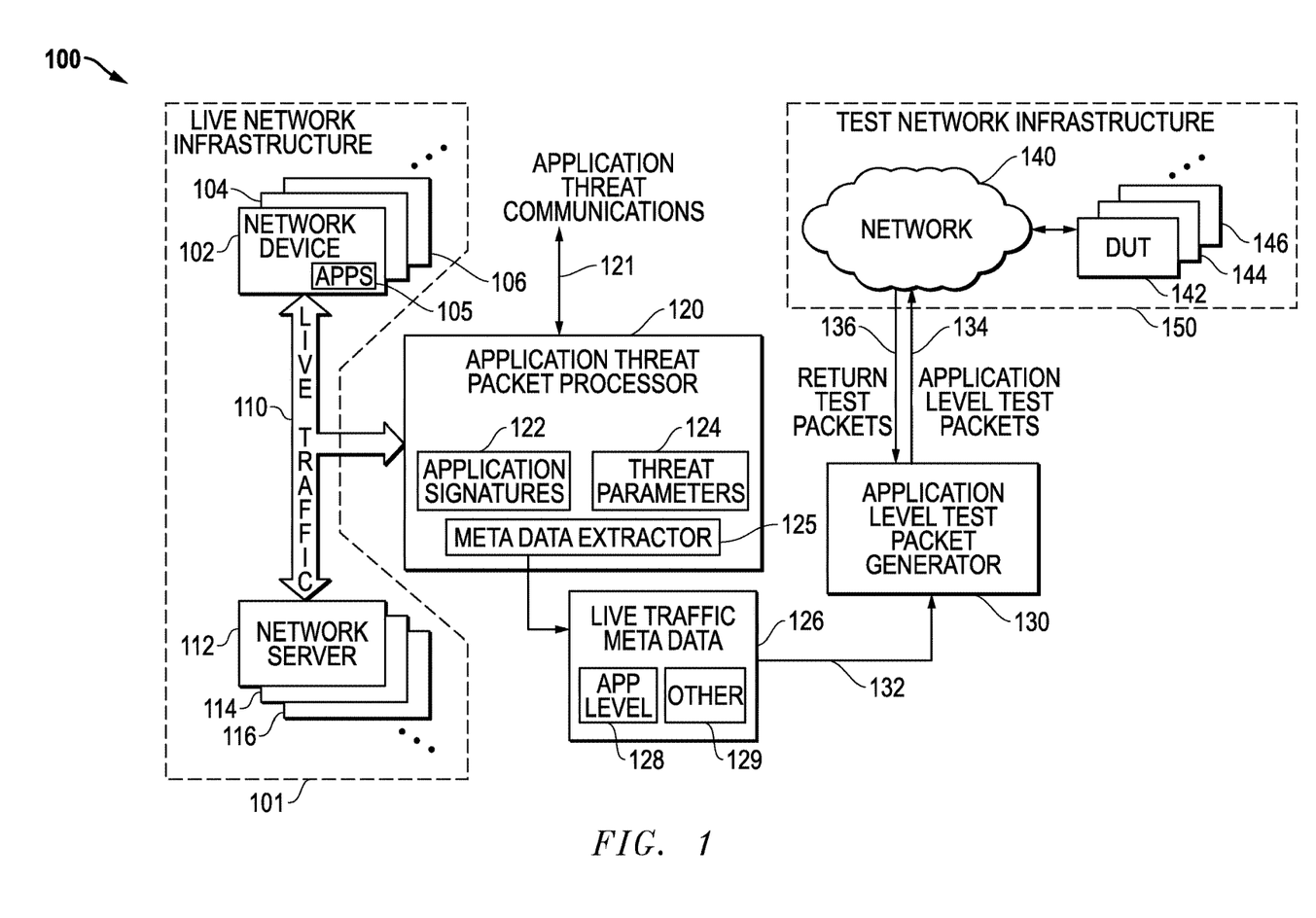
FIG. 1 is a block diagram of an example embodiment for a network environment where application level test packets are generated from live traffic meta-data collected from live traffic within a live network infrastructure.

FIG. 1 is a block diagram of an example embodiment 100 for a network environment where application level test packets 134 are generated from live traffic meta-data 126 collected from live traffic 110 within a live network infrastructure 101. For the example embodiment 100, each of the network devices 102, 104, 106 . . . is assumed to communicate network packets within one or more network flows to one or more or the network servers 112, 114, 116 . . . within a network communication system. The network devices 102, 104, 106, . . . can be any of a wide variety of devices capable of network packet communications including mobile handsets, personal computers, routers, switches, gateways, network attached storage systems, and/or other network connected devices. The network servers 112, 114, 116 . . . can be any of a wide variety of network server systems including DNS (Domain Name System) servers, mail servers, application servers, and/or other network connected servers. The network devices 102, 104, 116, . . . and the network servers 112, 114, 116 . . . can be part of a wide variety of network systems and devices connected together in a wide variety of topologies to form network infrastructure 101, and any number of wired and/or wireless systems and devices can be used to form this network infrastructure.

As shown with respect to network device 102, each network device 102, 104, 106, . . . can be configured to run one or more application (APPS) 105, for example, using an operating system (OS) and underlying hardware. It is assumed that these applications 105 within the network devices 102, 104, 106, . . . generate one or more packet flows that form live traffic 110 that includes network packets being communicated to and from the network servers 112, 114, 116, . . . and/or to other network connected systems that may be within network infrastructure 101. It is further noted that the network packets within the live traffic 110 can be communicated using various network communication layers. For example, OSI (Open System Interconnection) network layers can include an application level OSI layer (e.g., L7: application layer), mid-level OSI layers (e.g., L5: session layer, L6: presentation layer), and lower level OSI layers (e.g., L1: physical layer, L2: data link layer, L3: network layer, L4: transport layer). It is noted that application level traffic, meta-data, and test packets are used herein to refer to traffic, meta-data, and test packets associated with the application layer in such multi-layer network communications.

The application threat packet processor 120 monitors and analyzes the network packets and packet flows within the live traffic 110. In part, the application threat packet processor 120 can collect meta-data information, including application level meta-data as well as other desired meta-data, from header fields, protocol fields, content fields, and/or other fields within the monitored packets. For example, application level meta-data can be extracted from the L7 (application layer) content within the network packets. Examples of application level meta-data information includes DNS request information, SSL (Secure Socket Layer) certificate field information, HTTP (Hyper-Text Transport Protocol) header information, and/or other application level information. Other meta-data information can also be analyzed and extracted from the network packets such as device type, hardware type, operating system, and/or other information collected with respect to the live traffic 110. For example, in addition to L7 (application layer) content, meta-data information can be extracted from information associated with network communication layers L1-L6 for the live traffic 110.

For certain embodiments, the application threat packet processor 120 can be configured to compare collected meta-data information with application signatures stored in a signature database 122 to detect known applications operating within the network infrastructure 101. The application threat packet processor 120 can also be configured to compare information collected from the live traffic 110 to one or more threat parameters within a threat database 124 to identify threats within the network (e.g., external intrusions, virus attacks, etc.). The application threat packet processor 120 can then generate one or more application threat communications 121 that can be communicated to network administrators. It is noted that the application threat packet processor 120 can also be implemented as a packet processor or network analysis tool that provides additional and/or different functionality with respect to processing of network packets within live traffic 110 for the network infrastructure 101. For example, a packet processor 120 can be provided that detects network threats such as network intrusions or denial of service attacks.

The meta-data extractor 125 operates as part of the packet processor 120 and extracts live traffic meta-data 126 associated with the live traffic 110 being processed by the application threat packet processor 120. The live traffic meta-data 126 includes application level meta-data 128 and other meta-data 129 associated with the live traffic 110 being processed by the packet processor 120. The live traffic meta-data 126 can include, for example, information representing application types, application duration, bytes transmitted/received, IP end-points, and/or other information. As described further below, the application level test packet generator 130 receives the live traffic meta-data 126, including the application level meta-data 128, as an input 132 and generates application level test packets 134 that correlate to the live traffic 110 actually monitored and analyzed by the application threat packet processor 120. These application level test packets 134 are then provided through network 140 to devices under test (DUTs) 142, 144, 146 . . . within test network infrastructure 150.

It is noted that the live traffic meta-data 126 described herein can be stored within one or more data storage systems, and these data storage systems can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the packet processor 120 and the test packet generator 130 can be implemented using one or more processing devices programmed to provide the functionality described herein. For example, one or more processing devices, such as a processor, microcontroller, configurable logic device (e.g., CPLD (complex programmable logic device), FPGA (field programmable gate array)), and/or other processing device, can be programmed with software or other programming instructions to implement the functionality described herein. It is further noted that software or other programming instructions for such processing devices can be implemented as software or programming instructions embodied in one or more non-transitory computer-readable mediums (e.g., memory storage devices, FLASH memory, DRAM memory, reprogrammable storage devices, hard drives, floppy disks, DVDs, CD-ROMs, etc.) including software or programming instructions that when executed by the processing devices cause the processing devices to perform the processes, functions, and/or capabilities described herein for the application threat packet processor 120, the application level test packet generator 130, and/or their respective components.

Figure 2:
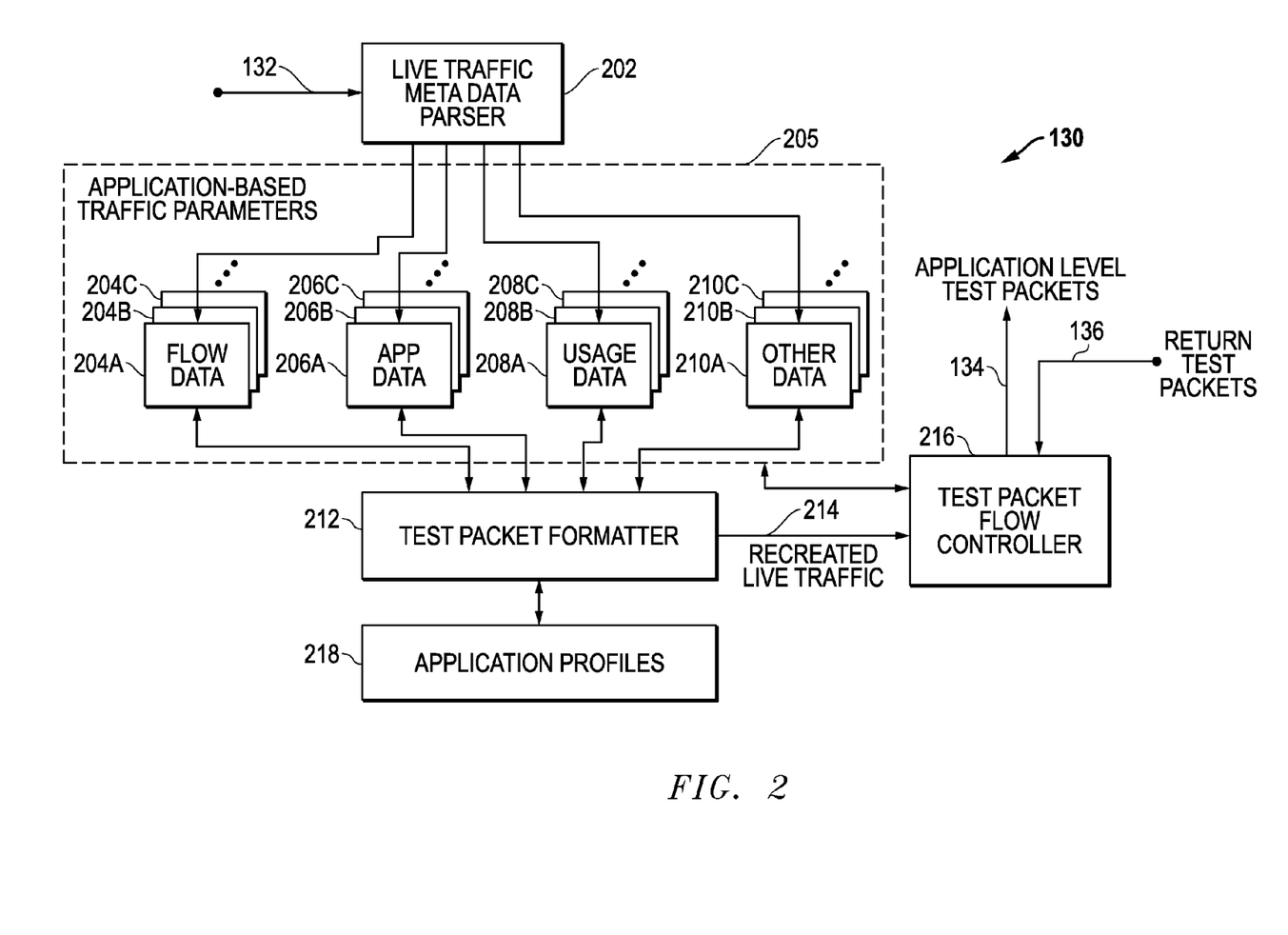
FIG. 2 is a block diagram of an example embodiment for application level test packet generator.

FIG. 2 is a block diagram of an example embodiment for application level test packet generator 130. The live traffic meta-data 126 is received as input 132 to a live traffic meta-data parser 202. The live traffic meta-data parser 202 processes the meta-data input 132 to identify application-based network traffic parameters 205 associated with the original live traffic 110. The application-based traffic parameters 205 are placed into per-application buckets of meta-data related parameters. For example, flow data 204A, application data 206A, usage data 208A, and/or other data 210A can be placed within a first meta-data bucket representing activity of a first application operating within the live traffic 110. Flow data 204B, application data 206B, usage data 208B, and/or other data 210B can be placed within a second mete-data bucket representing activity of a second application operating within the live traffic 110. Flow data 204C, application data 206C, usage data 208C, and/or other data 210C can be placed within a third mete-data bucket representing activity of a third application operating within the live traffic 110. Other meta-data buckets can also be provided for additional applications operating within the live traffic 110. As described further below, a test packet formatter 212 then uses the per-application meta-data buckets for application-based traffic parameters 205 to generate recreated live traffic 214 that is provided to a test packet flow controller 216. The test packet formatter 212 also uses application profiles 218 to format test packets according to application protocols for the application packets being recreated. It is noted that the payload for the recreated packets is synthetic but representative of payloads for applications running in the live network infrastructure 101. Advantageously, the recreated live traffic 214 is a recreation of the actual application level activity within original live traffic 110 within the live network infrastructure 101.

The live traffic meta-data parser 202, therefore, operates to process and parse the meta-data input 132 at the application level as opposed to simply considering per packet, per connection, and/or per flow information without application level information. As such, the traffic meta-data parser 202 can aggregate and average out flow and packet level information collected by a packet processor 120 at a node within a live traffic network into application-based traffic parameters 205 that effectively provide per-application buckets of meta-data collected within one or more collection time slots. Further, where application level information is not detected or collected by a packet processor 120 (e.g., application threat processor or other visibility tool), the live traffic meta-data parser 202 can still preserve the nature of traffic as much as possible. For example, the live traffic meta-data parser 202 can be configured to preserve transport type, transport port, and/or other packet related information while operating to processor and parse the live traffic meta-data input 132 into meta-data buckets associated with application operating within the live traffic 110.

As indicated above, the meta-data traffic parameters 205 generated by the live traffic meta-data parser 202 can include flow data 204A-C, application data 206A-C, usage data 208A-C, and/or other data 210A-C. Flow data 204A-C can include, for example, data such as average flow size, average packet size, total flows, flow initiation rate, maximum concurrent flows within a time interval within a collection time slot, transport protocol, transport port, and/or other flow related data. Application data 206 can include, for example, data such as application linking data and/or other application related data. For example, multiple application buckets can be linked based upon linking dependency data collected by the packet processor 120 such as where one or more secondary application flows are originated as a result of a primary application flow. For example, an FTP (file transfer protocol) control application flow can generate one or more FTP data application flows. As another example, Skype or another peer-to-peer application can generate one or more secondary application flows based upon a primary application flow. Other secondary applications linked to primary application could also be generated and linked by dependency data collected by the packet processor 120. Usage data 208 can include, for example, data providing total upload bytes, total download bytes, and/or average throughput, and/or other usage related data. Other data 210 can include extracted endpoints (e.g., IP (internet protocol) addresses) that are responsible for flows and/or bytes exchanged, extracted URL (uniform resource locator) domain names for HTTP (hypertext transfer protocol) requests that are not identified as specific application, and/or other extracted information.

The test packet formatter 212 operates to further process the application-based traffic parameters 205 generated by the live traffic meta-data parser 202. For example, the test packet formatter 212 can operate to use the traffic parameters 205, including the application data 206 and other data 210, to define application level test packets. This test packet definition can include, for example, application specific signatures, where known and stored, from the application profiles 218.

The test packet flow controller 216 controls the packet flows to the test network infrastructure 150 and in part outputs the application level test packets 134 to the test network infrastructure 150 and receives back return test packets 136 from the test network infrastructure 150. The test packet flow controller 216 can also use the application-based traffic parameters 205 such as meta-data parameters from one or more of the per-application buckets including flow data 204A-C, application data 206A-C, usage data 208A-C, and/or other data 210A-C. For example, meta-data (e.g., flow initiation rates) from application-based flow data 204A-C, meta-data (e.g., average throughput) from application-based usage data 208A-C, and/or other application-based traffic parameters 205 can be used by the test packet flow controller 216. It is noted that for further embodiments, the return test packets 136 and the application level test packets 134 can be processed and analyzed to determine operational details concerning the test network infrastructure 150. For example, where the test network infrastructure 150 represents new network devices and systems not yet put into operation within a live network environment, the test packets 134/136 can be analyzed to determine if these new network devices and systems operate properly within the test environment based upon the application level test packets 134 generated from live traffic 110 monitored within the live network infrastructure 101.

Figure 3:
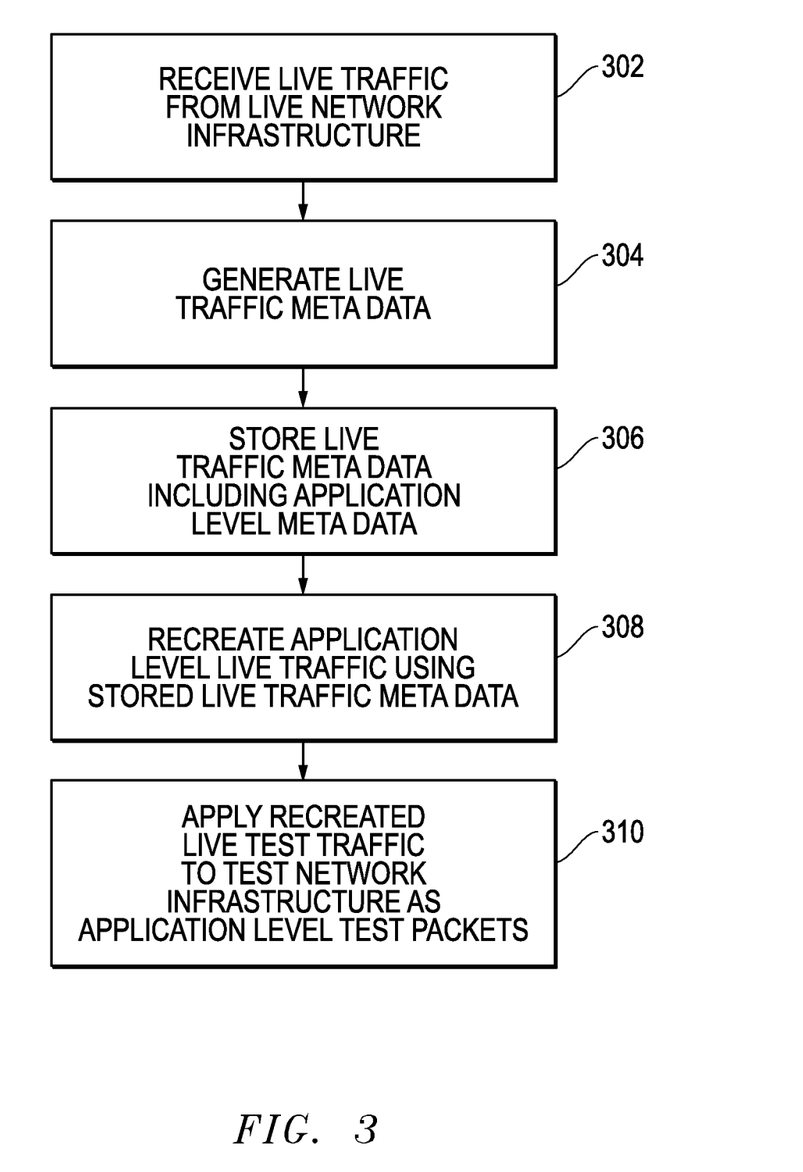
FIG. 3 is a process flow diagram of an example embodiment to collect live traffic meta-data from live traffic within a live network infrastructure and later generating application level test packets for a test network infrastructure.

FIG. 3 is a process flow diagram of an example embodiment 300 to collect live traffic meta-data 126 from live traffic 110 within a live network infrastructure 101 and later generating application level test packets 134 for a test network infrastructure 150. In block 302, the live traffic 110 is received from the live network infrastructure 101. In block 304, live traffic meta-data 126 is generated from the live traffic 110. In block 306, the live traffic meta-data 126 is stored, and this live traffic meta-data 126 includes application level meta-data 128 as well as other desired meta-data 129. In block 308, application level live traffic 214 is recreated using the stored live traffic meta-data 126. In block 310, the recreated live traffic 214 is applied to the test network infrastructure 150 as application level test packets 134. It is noted that additional and/or different process blocks could also be used.

Figure 4A:
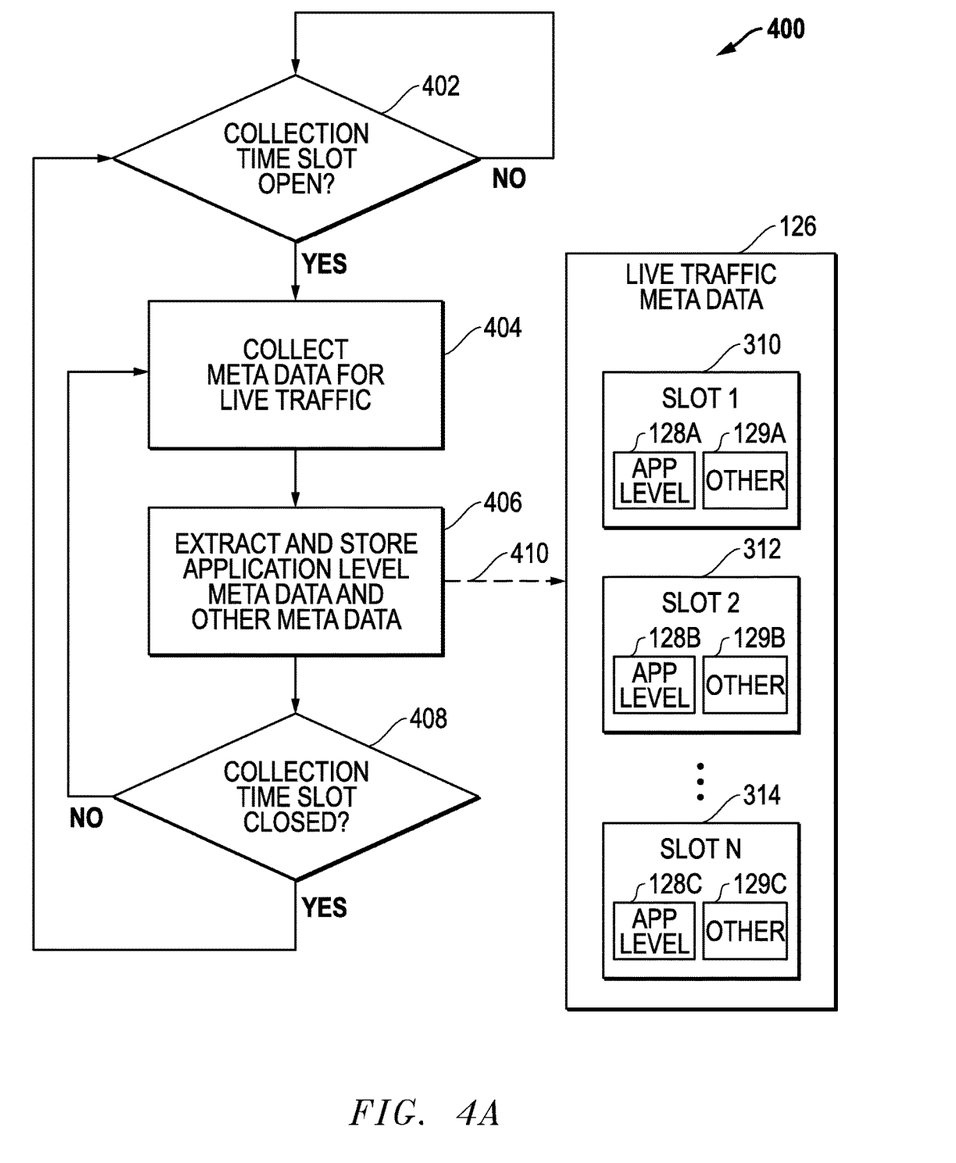
FIG. 4A is a process flow diagram of an example embodiment to apply one or more time slots (SLOT 1, SLOT 2, . . . SLOT N) to collect and store the live traffic meta-data including the application level meta-data.

FIG. 4A is a process flow diagram of an example embodiment 400 to apply one or more time slots (SLOT 1, SLOT 2, . . . SLOT N) to collect and store the live traffic meta-data 126 including the application level meta-data 128. In block 402, a determination is made whether a collection time slot (SLOT 1, SLOT 2, . . . SLOT N) is open. If "NO," then flow passes back to block 402. If "YES," then flow passes to block 404 where packet meta-data is received for the live traffic 101. In block 406, live traffic meta-data 126 including application level meta-data 128 and other meta-data 129 is stored in one or more data storage systems as indicated by dashed arrow 410. In block 408, a determination is made whether the collection time slot has closed. If "NO," then flow passes back block 404. If "YES," then collection for the time slot ends, and flow passes back to block 402. As shown for embodiment 400, the live traffic meta-data 126 can therefore be stored for multiple different time slots. For example, stored meta-data 310 represents live traffic meta-data stored for a first time slot (SLOT 1) and includes application level meta-data 128A and other meta-data 129A for this first time slot (SLOT 1). Stored meta-data 312 represents live traffic meta-data stored for a second time slot (SLOT 2) and includes application level meta-data 128B and other meta-data 129B for this second time slot (SLOT 2). This meta-data storage per time slot continues for each time slot. Stored meta-data 314 represents live traffic meta-data stored for the Nth time slot (SLOT N) and includes application level meta-data 128C and other meta-data 129C for this first time slot (SLOT N). It is further noted that the number of slots and the duration of each slot can be user configurable.

As described herein, the application level meta-data 128 represents activity of one or more application within the live network infrastructure 101. For example, applications operating within the live network infrastructure 101 can include mail server applications, communication application, shopping applications, browser applications, gaming applications, social media applications, word processing applications, spreadsheet applications, presentation applications, calendar applications, and/or other applications. Further, in addition to the identify of applications operating within the live traffic network infrastructure 101, the application level meta-data 128 can also represent the amount of traffic associated with each application, such as for example, a bandwidth utilization percentage for each application as compared to other applications operating during the time slot. Additional and/or different meta-data representations can also be collected. TABLE 1 below provides an example embodiment for different time slots have start/end collections times and resulting in the collection of live traffic meta-data 126 representing the operation of different applications within the time slots.

TABLE

EXAMPLE META-DATA COLLECTION USING TIME SLOTS

| TIME SLOT | START TIME | END TIME | APPLICATION LIST | BANDWIDTH USAGE |
|---|---|---|---|---|
| 1 | T1S | T1E | APP1 | 50% |
|   |     |     | APP2 | 15% |
|   |     |     | APP3 | 35% |
| 2 | T2S | T2E | APP1 | 35% |
|   |     |     | APP4 | 65% |
| 3 | T3S | T3E | APP5 | 20% |
|   |     |     | APP6 | 55% |
|   |     |     | APP7 | 25% |
| 4 | T4S | T4E | APP8 | 40% |
|   |     |     | APP6 | 45% |
|   |     |     | APP7 | 15% |
| ... | ... | ... | ... | ... |

As described above, the live traffic meta-data 126 is used to generate application level test packets 134 for the test network infrastructure 150 that is a recreation of the live traffic 101 experienced within the live network infrastructure 101. The application level meta-data 128 and other meta-data 129 collected within each time slot are then used to recreate the live traffic for that time slot. As such, the test network infrastructure 150 can be tested using application level test traffic 134 that recreates the applications operating within the live network infrastructure 101 during that particular time slot as well as the relative bandwidth or traffic levels for that traffic.

It is further noted that within each time slot, the monitored traffic can be segmented into multiple segments. For example, assume live traffic 110 was monitored for X hours (e.g., 2 hours) within a time slot, and live traffic meta-data 312 was generated and stored. These data records can then be processed and time boxed into Y minute time periods (e.g., 15 minute time periods) resulting in Z such time periods (e.g. eight time periods). The application mix within each time period can then be was identified along with other relevant data (e.g., byte count, IP end points, etc.). Recreated lived traffic 214 can then be generated for the application traffic (e.g., sessions and flows) matching each of the applications within the time period while maintaining the bandwidth ratios between the various applications. In the next time period, the application mix appropriate for this time period is also recreated, and any traffic that is not representing an application in the new time period can be stopped. Further, new traffic can be started for any new application within the next time period. This process can then be repeated until all time periods are completed. Variations can also be implemented.

Figure 4B:
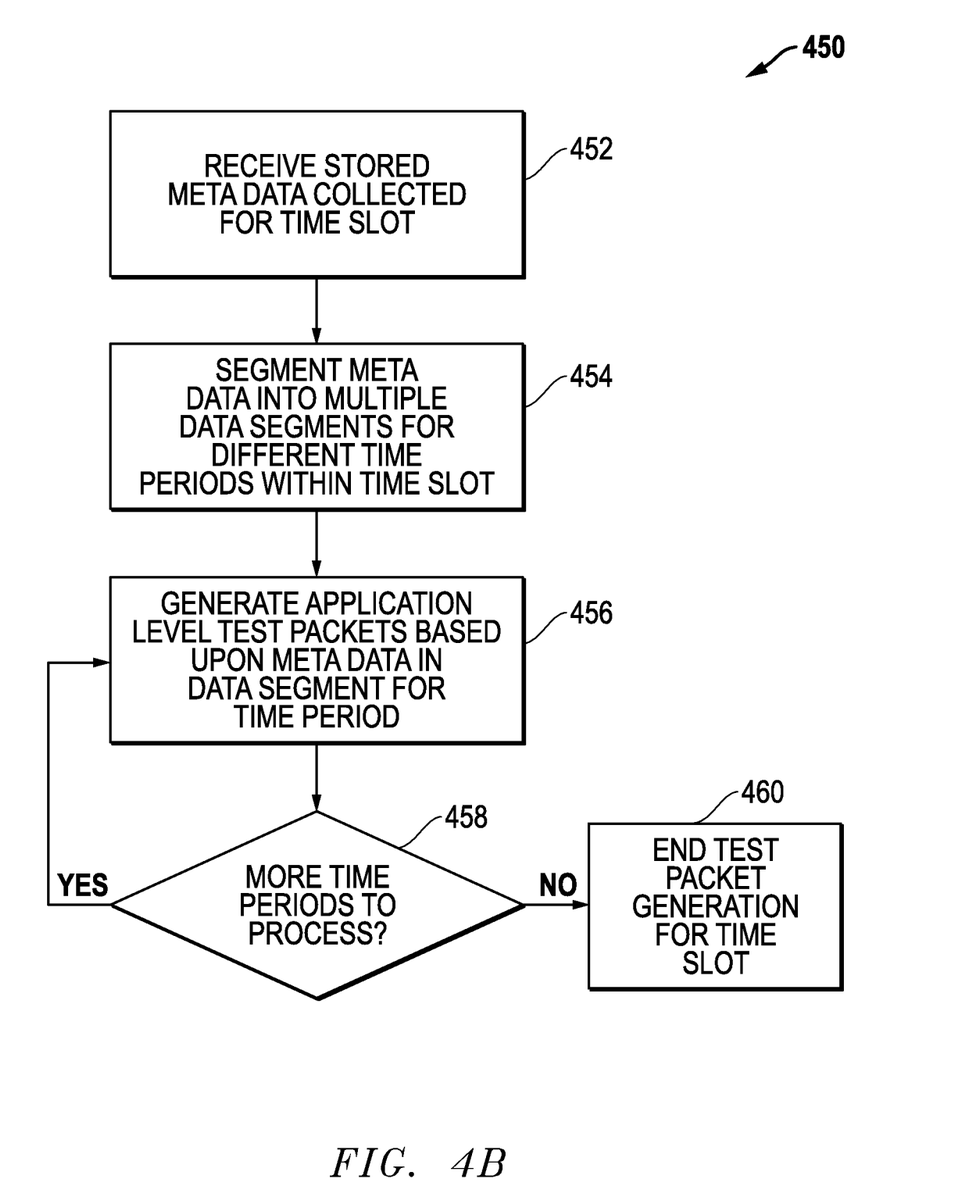
FIG. 4B is a process flow diagram of an example embodiment to generate application level test packets for each of a plurality of different time periods within a collection time slot.

FIG. 4B is a process flow diagram of an example embodiment 450 to generate application level test packets 134 for each of a plurality of different time periods within a collection time slot. In block 452, stored meta-data collected for a time slot is received. In block 454, the stored meta-data is segmented into multiple data segments for different time periods within the collection time slot. In block 456, application level test packets are generated for one of the time periods based upon meta-data within a data segment associated with that time period. In block 458, a determination is made whether there are more time periods to process. If "YES," then flow passes back to 456 where application level test packets are generated for the next time period. If "NO," then flow passes to block 460 where test packet generation is ended for the collection time slot.

TABLE 2 below provides an example embodiment for different time periods within the first time slot (SLOT 1) and applications present within these time periods.

TABLE

EXAMPLE TIME PERIODS WITHIN A COLLECTION TIME SLOT

| TIME PERIOD | APPLICATION LIST | BANDWIDTH USAGE |
|---|---|---|
| 1 | APP1 | 50% |
|   | APP2 | 15% |
|   | APP3 | 35% |
| 2 | APP1 | 35% |
|   | APP3 | 65% |
| 3 | APP2 | 45% |
|   | APP3 | 55% |
| ... | ... | ... |
| Z | APP1 | 40% |
|   | APP2 | 45% |
|   | APP3 | 15% |

Figure 5:
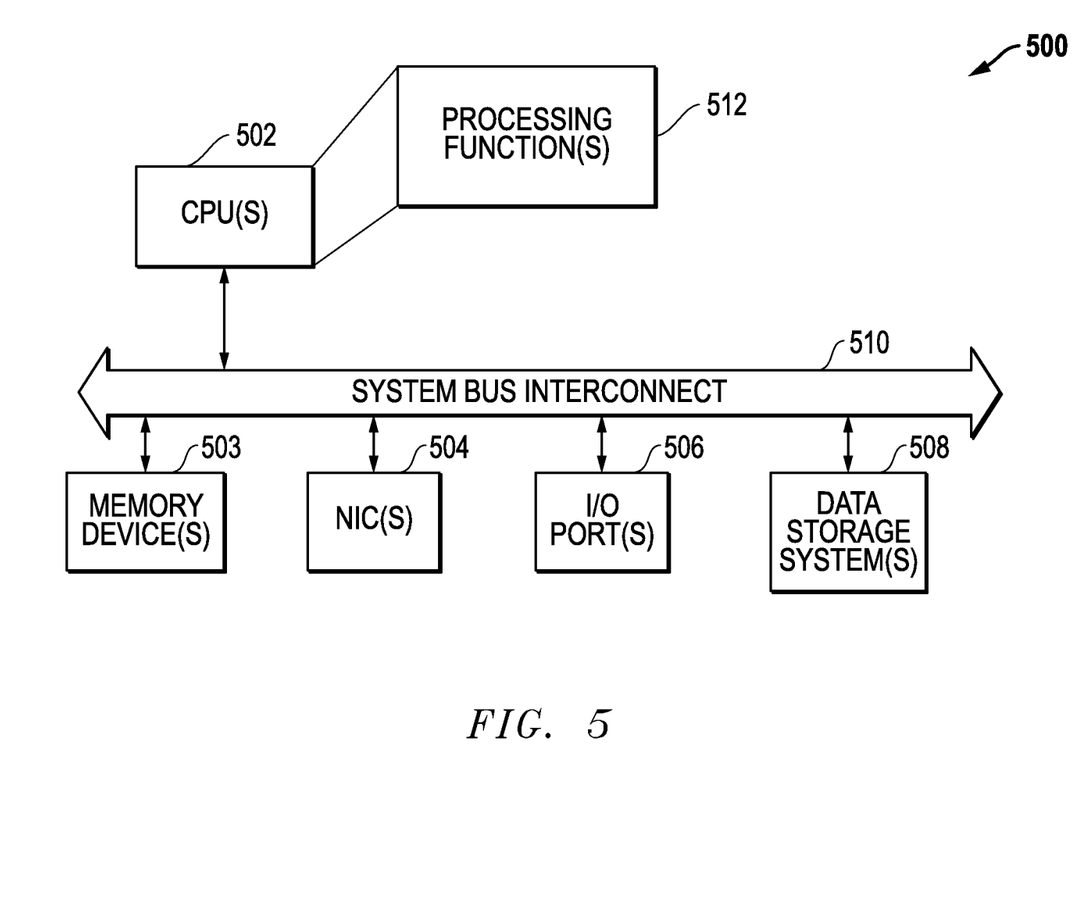
FIG. 5 is a block diagram of an example embodiment for a hardware environment for a packet processor and/or a test packet generator.

FIG. 5 is a block diagram of an example embodiment 500 for a hardware environment for a packet processor 120 and/or test packet generator 130 described above. For the example embodiment depicted, the hardware embodiment 500 includes one or more central processing units (CPUs)

502 or other processing devices (e.g., FPGAs, CPLDs, etc.) programmed or otherwise configured to implement the one or more processing functions 512 for the embodiments described herein. The hardware embodiment 500 also includes one or more network interface cards (NICs) 504, one or more input/output (I/O) ports 506, one or more non-volatile data storage systems 508, and one or more memory devices 503 coupled to communicate with each other through a system bus interconnect 510. In operation, the CPUs 502 and/or processing load and execute software code and/or programming instructions stored in the data storage systems 508 to perform the functions described herein.

It is further noted that the functional blocks, components, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to generate test packets, comprising:
    operating one or more processing devices including at least one of a processor or a configurable logic device configured to execute instructions embodied in one or more non-transitory computer-readable mediums to provide a packet processor, the packet processor:
        monitoring live network traffic within a live network infrastructure;
        collecting live traffic meta-data associated with network packets within the live network traffic;
        extracting application level meta-data from the live traffic meta-data; and
        storing the application level meta-data extracted from the live traffic meta-data in one or more data storage systems;
    operating one or more processing devices including at least one of a processor or a configurable logic device configured to execute instructions embodied in one or more non-transitory computer-readable mediums to provide a test packet generator, the test packet generator:
        receiving the application level meta-data extracted from the live traffic meta-data and stored in the one or more data storage systems;
        generating application level test packets based upon the application level meta-data, the application level test packets representing a recreation of application level activity within the live network traffic;
        forwarding the application level test packets to one or more devices under test within a test network infrastructure to test proper operation of the one or more devices under test based upon the recreation of application level activity within the live network traffic; and
        receiving return test packets from the one or more devices under test within the test network infrastructure;
    wherein the collecting occurs over multiple time slots, and wherein in the generating further comprises generating application level test packets for each time slot based upon application level meta-data extracted from live traffic meta-data collected during that time slot.

2. The method of claim 1, further comprising, with the test packet generator, segmenting the application level meta-data for the time slots into multiple data segments associated with different time periods within the time slots.

3. The method of claim 2, wherein the generating comprises generating application level test packets for each time period based upon the application level meta-data for that time period.

4. The method of claim 2, wherein the application level meta-data comprises application data and usage data associated with the application data.

5. The method of claim 4, wherein the generating comprises generating application level test packets for each time period based upon the application data and the usage data within the application level meta-data for that time period.

6. The method of claim 1, wherein the monitoring comprises processing the live network traffic to identify a network related threat within the live network traffic.

7. The method of claim 1, further comprising comparing, with the packet processor, the live network traffic to application signatures to identify applications operating within the live network infrastructure.

8. The method of claim 1, further comprising parsing, with the test pact generator, the application level meta-data to identify traffic parameters, and using the traffic parameters to generate the application level test packets.

9. The method of claim 8, wherein the traffic parameters comprise application data, and further comprising, with the test packet generator, using application profiles to generate the application level test packets based upon the application data.

10. A system to generate test packets, comprising:
one or more processing devices including at least one of a processor or a configurable logic device configured to execute instructions embodied in one or more non-transitory computer-readable mediums to provide a packet processor, the packet processor configured to:
  monitor live network traffic within a live network infrastructure;
  collect live traffic meta-data associated with network packets within the live network traffic;
  extract application level meta-data from the live traffic meta-data; and
  store the application level meta-data extracted from the live traffic meta-data in one or more data storage systems; and
one or more processing devices including at least one of a processor or a configurable logic device configured to execute instructions embodied in one or more non-transitory computer-readable mediums to provide a test packet generator, the test packet generator configured to:
  receive the stored application level meta-data extracted from the live traffic meta-data and stored in the one or more data storage systems;
  generate application level test packets based upon the application level meta-data, the application level test packets representing a recreation of application level activity within the live network traffic;
  forward the application level test packets to one or more devices under test within a test network infrastructure to test proper operation of the one or more devices under test based upon the recreation of application level activity within the live network traffic; and
  receive return test packets from the one or more devices under test within the test network infrastructure;
wherein the packet processor is further configured to collect live traffic meta-data over multiple time slots, and wherein the test packet generator is further configured to generate application level test packets for each time slot based upon application level meta-data extracted from live traffic meta-data collected during that time slot.

11. The system of claim 10, wherein the test packet generator is further configured to segment the application level meta-data for the time slots into multiple data segments associated with different time periods within the time slots.

12. The system of claim 11, the test packet generator is further configured to generate application level test packets for each time period based upon the application level meta-data for that time period.

13. The system of claim 11, wherein the application level meta-data comprises application data and usage data associated with the application data.

14. The system of claim 13, wherein the test packet generator is further configured to generate application level test packets for each time period based upon the application data and the usage data within the application level meta-data for that time period.

15. The system of claim 10, wherein the packet processor is further configured to process the live network traffic to identify a network related threat within the live network traffic.

16. The system of claim 10, wherein the packet processor is further configured to compare the live network traffic to application signatures to identify applications operating within the live network infrastructure.

17. The system of claim 10, wherein the test packet generator is further configured to parse the application level meta-data to identify traffic parameters and to use the traffic parameters to generate the application level test packets.

18. The system of claim 17, wherein the traffic parameters comprise application data, and wherein the test packet generator is further configured to use application profiles to generate the application level test packets based upon the application data.

* * * * *